June 11, 1957     F. L. HAUSHALTER     2,795,037
METHOD OF MAKING A VIBRATION DAMPER
Filed April 26, 1954     2 Sheets-Sheet 1
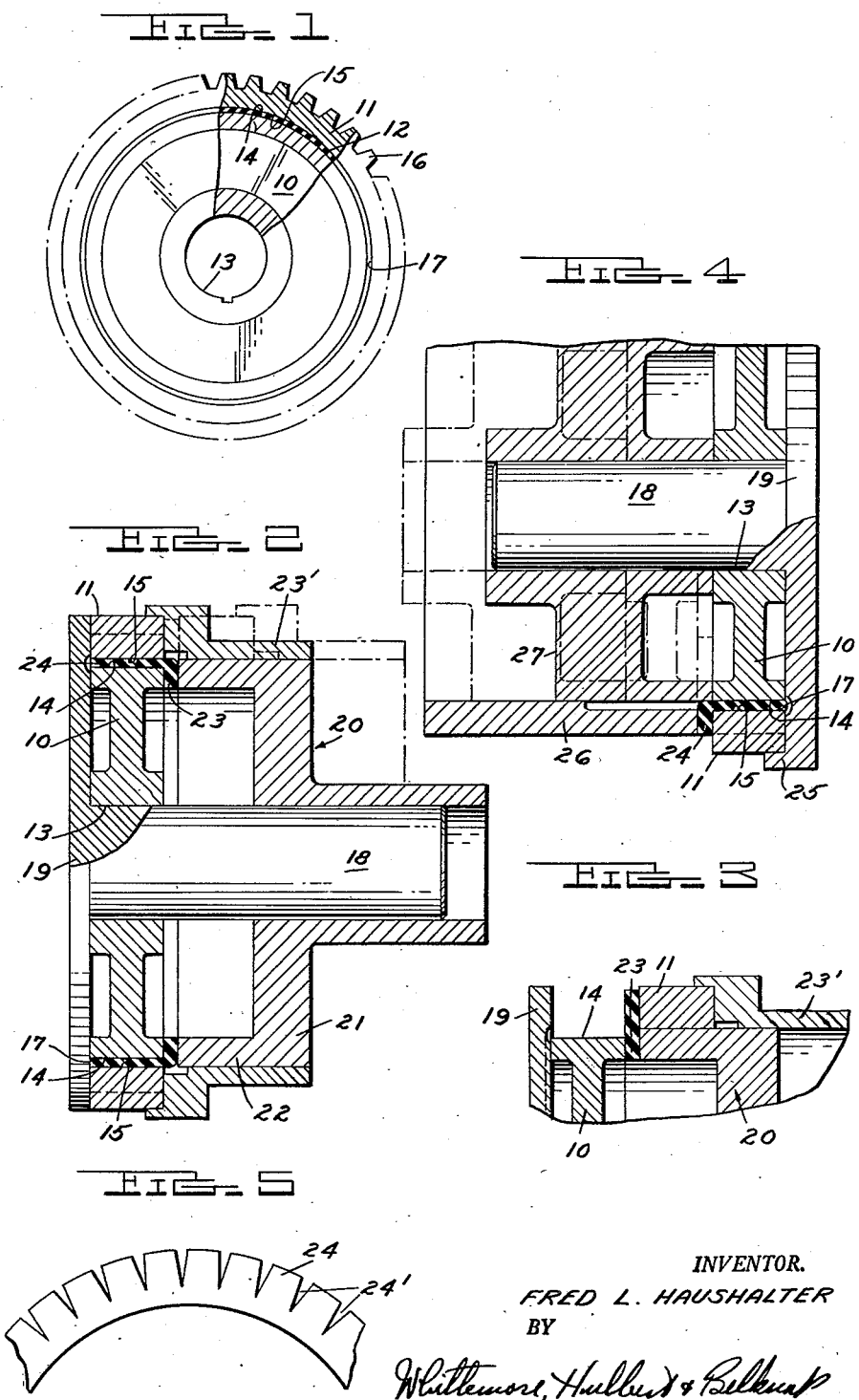
INVENTOR.
FRED L. HAUSHALTER

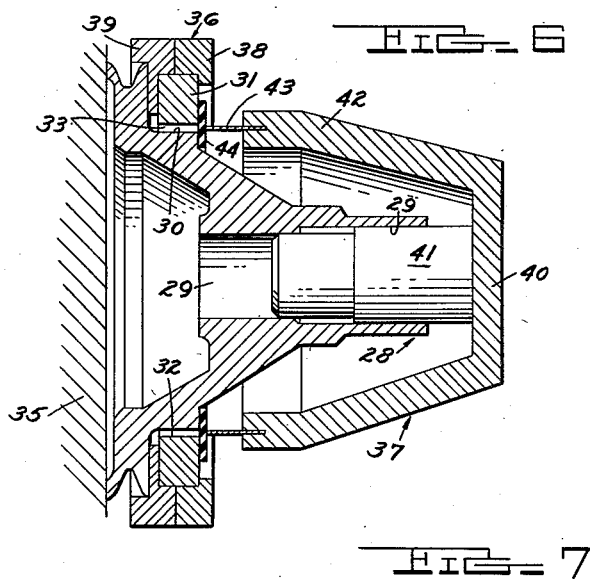
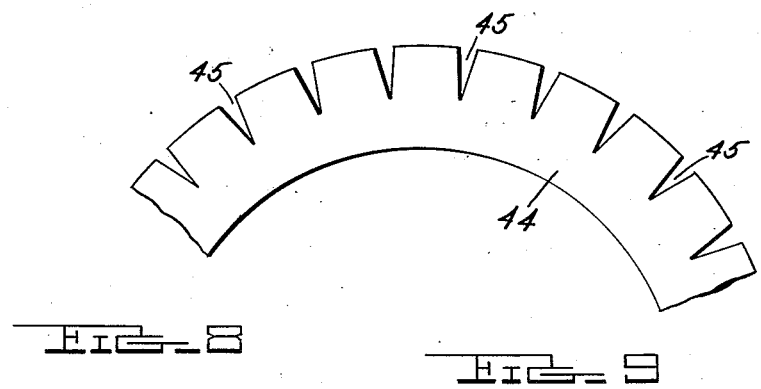
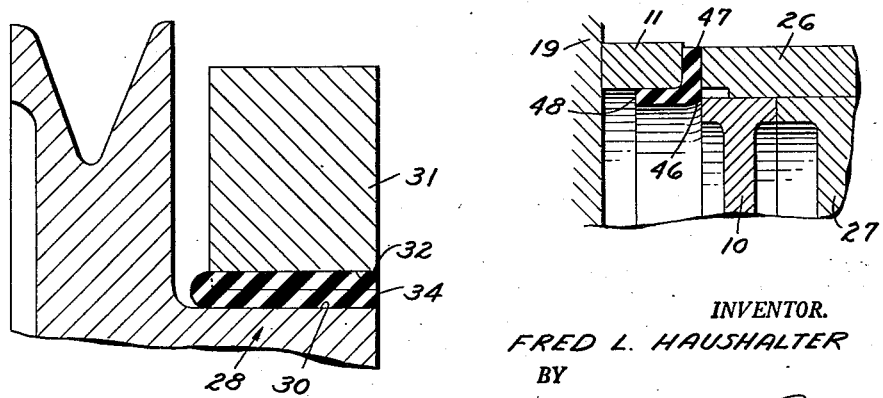
INVENTOR.
FRED L. HAUSHALTER

United States Patent Office 2,795,037
Patented June 11, 1957

2,795,037

METHOD OF MAKING A VIBRATION DAMPER

Fred L. Haushalter, Pontiac, Mich.

Application April 26, 1954, Serial No. 425,517

7 Claims. (Cl. 29—450)

This invention relates to articles of manufacture having damping or shock absorbing characteristics and refers to improved methods of making such articles.

More particularly, this invention relates to a method of making an article of manufacture having a rotatable body member and having a member fastened to the body member by an element formed of an elastic deformable material such, for example, as rubber. In accordance with this invention, the elastic element is stretched within its elastic limits during assembly between concentric cylindrical surfaces on the members in a manner such that the element is placed under sufficient tension between the cylindrical surfaces to securely hold the members in assembled relationship and, at the same time, to permit the relative movement of the members required to not only effectively absorb shocks or noise producing vibrations, but to also dampen torsional vibrations.

With the above in view, it is an object of this invention to provide an improved resilient joint between a pair of members characterized in that it not only dampens torsional and other noise producing vibrations or shocks but, in addition, securely fastens the members together without resorting to expensive bonding or vulcanizing operations.

It is another object of this invention to provide improved methods of assembling the members and element which methods possess a relatively few simple steps capable of being inexpensively performed with a minimum amount of equipment.

The foregoing as well as other objects will be made more apparent as this description proceeds, especially when considered in connection with the accompanying drawings, wherein:

Figure 1 is a sectional view of a product embodying the features of this invention;

Figure 2 is a longitudinal sectional view of one type of equipment capable of being used to assemble the product shown in Figure 1;

Figure 3 is a fragmentary sectional view similar to Figure 2 showing the parts in a different position;

Figure 4 is a fragmentary sectional view showing a somewhat different manner of assembling the product shown in Figure 1;

Figure 5 is an elevational view of the resilient ring employed in the product shown in Figure 1;

Figure 6 is a sectional view showing still another form of the invention;

Figure 7 is an elevational view of the rubber ring employed in the embodiment shown in Figure 6;

Figure 8 is a fragmentary sectional view of a vibration damper assembled in accordance with the equipment shown in Figure 6; and Figure 9 is a fragmentary sectional view showing a further embodiment of this invention.

Referring first to the embodiment of the invention shown in Figures 1, 2, 3 and 5 of the drawings, it will be noted that the product illustrated in Figure 1 is in the form of a gear, although it will be understood from the following description that the principles involved herein may be used in connection with numerous different products where it is desired to provide a resilient joint between two members. In detail, the gear shown in Figure 1 comprises a pair of rotatable members 10 and 11 resiliently connected by a ring 12 of an elastic deformable material such, for example, as rubber.

The body member 10 has a central bore 13 therethrough for receiving a shaft (not shown) and has a cylindrical peripheral surface 14 concentric with the axis of the bore 13. The member 11 is in the form of an annulus having an internal cylindrical surface 15 which surrounds the surface 14 in concentric relationship thereto and, in the present instance, is fashioned to provide gear teeth 16 on the periphery thereof. The cylindrical surface 15 on the member 11 has an internal diameter sufficiently greater than the external diameter of the cylindrical surface 14 on the body member 10 to provide an annular space 17 between the cylindrical surfaces of the required width to accommodate the amount of resilient material necessary to perform the specified results.

The elastic or resilient ring 12 may and preferably is formed of sheet stock and has a width which is normally greater than the axial extent of the cylindrical surfaces 14 and 15. The fabrication of the ring 12 from sheet stock is preferred because it renders it possible to inexpensively form rings to any specified thickness on a high volume production basis with a conventional rubber ring slicing machine well known to the trade. In any case, the ring 12 has a thickness greater than the width of the annular space 17 and is held under tension between the cylindrical surfaces 14 and 15. The degree of tension under which the ring 12 is placed varies in proportion to the difference between the width of the annular space 17 and the thickness of the ring 12, and depends largely on the results required. In any case, the ring 12 securely holds the members 10 and 11 in assembled relationship without resorting to expensive bonding or vulcanizing operations and, at the same time, is highly effective for absorbing torsional or other noise producing vibrations and shocks.

Figures 2 and 3 of the drawings illustrate one type of equipment that may be employed to assemble the device shown in Figure 1. In detail, the numeral 18 indicates a shaft having an abutment 19 extending radially outwardly from one end and having a diameter such that the body member 10 may be slidably supported thereon. Also, slidably supported on the shaft 18 is a clamping device 20 having a radially outwardly extending flange 21 terminating in an annular flange 22 projecting axially of the shaft 18 toward the abutment 19. The external diameter of the flange 22 is such that it slidably supports the member 11 and also a slide 23.

In use, the body member 10 is mounted on the shaft 18 in a position to engage the abutment 19 and the member 11 is slidably mounted on the flange 22 in axial spaced relationship to the body member 10. A ring 24 of elastic deformable material dimensioned to form the ring 12 is interposed between the body member 10 and the member 11, as shown in Figure 3. The radially inner portion of the ring 24 is clamped to the rear face of the body member 10 adjacent the cylindrical surface 14 by the clamping device 20. In detail, the clamping device 20 is moved forwardly along the shaft 18 by any suitable means (not shown) to engage the front edge of the annular flange 22 with the radially inner portion aforesaid of the ring 24.

During the above operation, the member 11 is supported on the flange 22 at the rear side of the ring 24 and following the clamping operation the member 11 is moved forwardly along the flange 22. As a result, the member 11 engages the free portion of the ring 24 extending radially beyond the portion engaged by the clamping device 20 and folds the free portion over the cylindrical surface 14 on the body member. During the folding operation, the free portion of the ring 24 is stretched sufficiently to enable displacing the same into the annular space 17 existing between the cylindrical surfaces on the members and, when the member 11 reaches its final position in concentric relationship to the body member 10, the ring is confined within the space 17 under considerable tension. As stated above, the ring 24 is held under sufficient tension between the cylindrical surfaces 14 and 15 to effectively secure the member 11 to the body 10 without the necessity of bonding or vulcanizing the ring to either or both of the members. At the same time, the ring possesses sufficient cushioning characteristics to effectively absorb torsional or noise producing vibrations.

In order to facilitate introducing the ring 24 into the annular space 17 between the concentric cylindrical surfaces, the free portion of the ring is lubricated with a lubricant characterized in that it is absorbed by the material from which the ring is formed so that subsequent to assembly the lubricant does not promote slippage between the ring and either of the members. Also in order to avoid buckling of the ring during assembly, it is preferred to form the ring with a multiplicity of circumferentially spaced notches 24' which extend radially inwardly from the periphery of the ring toward the inner edge of the latter, as shown in Figure 5 of the drawings. After the ring 24 is displaced into the annular space 17 provided between the cylindrical surfaces 14 and 15, the clamping device 20 is released and the ring 24 is trimmed to provide the ring 12 shown in Figure 1 of the drawings.

The embodiment of the invention shown in Figure 4 of the drawings differs from the one previously described in that the member 11 is held in position against the abutment 19 while the body member 10 is moved axially into the inertia member to fold the rubber ring 24 over the cylindrical surface 15 of the annular member 11. As shown in Figure 4 of the drawings, the abutment 19 has a rearwardly extending annular flange 25 fashioned to hold the member 11 in position against the abutment. The outer peripheral portion of the ring 24 is clamped against the rear face of the member 11 adjacent the cylindrical surface 15 by a sleeve 26 and the inner portion of the ring 24 assumes a position at the front side of the body member 10. The clamping sleeve 26 is slidably supported on a slide 27 which in turn is slidably mounted on the shaft 18 at the rear side of the body member 10. Thus, forward movement of the slide 27 displaces the body member 10 in a corresponding direction into the annular member 11. As the body member 10 moves into the annular member 11, the inner free portion of the ring 24 is folded over the cylindrical surface 15 on the member 11 and is stretched in the same manner previously described. However, in the embodiment of the invention shown in Figure 4, the radially inner portion of the ring 24 is folded and hence the notches 24' may be omitted.

In the embodiment of the invention show in Figures 6 and 7, it will be noted that the reference numeral 28 indicates a rotatable member in the form of a pulley adapted for installation on a crank shaft of an internal combustion engine, for example. The pulley 28 is fashioned with an axially extending bore 29 for receiving the crank shaft and with a cylindrical surface 30 concentric to the axis of the bore 29. Surrounding the cylindrical surface 30 is an inertia member 31 having a cylindrical surface 32 concentrically arranged with respect to the cylindrical surface 30. The cylindrical surface 32 on the inertia member 31 is of greater diameter than the cylindrical surface 30 on the rotatable member 28 to provide an annular space 33 therebetween for receiving a ring 34 of elastic deformable material such, for example, as rubber as shown in Figure 7. The ring 34 performs the same results as the ring 12 previously described in connection with Figure 1 of the drawings. However, the ring 34 is folded upon itself to provide a double thickness of material between the surfaces 30 and 32.

The ring 34 is assembled within the annular space 33 by a fixture comprising a support 35, a spacer 36, and a head 37. The support 19 provides an abutment for engaging the front side of the pulley or member 28 and may be in the form of a surface plate, if desired. The spacer 36 is formed of two annular sections 38 and 39 removably clamped together in any suitable manner, not shown herein. The sections 38 and 39 cooperate with one another to hold the inertia member 31 with its cylindrical surface 32 in concentric relationship to the cylindrical surface 30 on the member 28 prior to installing the rubber ring 34 into the annular space 33.

The head 37 is generally cup-shaped having a base portion 40 provided with an axially extending shaft 41 and having an annular flange 42 encircling the shaft 41. The shaft 41 has a sliding fit with the bore 29 in the rotatable member 28 and serves to pilot movement of the head 37 axially of the bore 29. The annular flange 42 has an annular groove in the free edge for receiving a steel ring 43. The ring 43 projects axially forwardly from the flange 42 in concentric relationship to the axis of the bore 29 in the rotatable member 28 and registers with the annular space 33. The thickness of the ring 43 is substantially less than the width of the annular space 33 in order to enable projecting the forward end of the ring 43 freely into the annular space 33 upon movement of the head 37 relative to the rotatable member 28 in a forward direction.

The numeral 44 designates a ring of elastic deformable material such as rubber having circumferentially spaced notches 45 extending radially inwardly from the periphery thereof and adapted to bridge the annular space 33 at the rear side of the inertia member 31 in the manner clearly shown in Figure 6 of the drawings. The arrangement is such that forward movement of the head 37 from the position thereof shown in Figure 6 of the drawings engages the ring 43 with the portion of the ring 44 registering with the annular space 33 and continued forward movement of the head 37 forces the ring 44 into the annular space 33 to form the ring 34. It will be apparent that as the ring 44 is forced into the annular space 33 it is folded upon itself and stretched considerably, depending on the thickness of the ring 44 in relation to the width of the annular space 33. Buckling or deformation of the peripheral portion of the ring 44 during assembly is avoided by virtue of the notches 45 and the ring is preferably lubricated with a lubricant characterized in that it is absorbed by the material from which the ring is formed. In any case, the ring 34, formed by the ring 44, is placed under sufficient tension between the rotatable member 28 and the inertia member 31 to hold the members in assembled relationship and, at the same time, dampen torsional or other noise producing vibrations. The steel ring 43 may either be removed subsequent to assembly or may be left in place to provide a stabilizing member in the event the latter is found desirable.

The embodiment of the invention shown in Figure 9 of the drawings discloses equipment similar to that shown in Figure 4 of the drawings and the same reference numerals are used to designate corresponding parts. In Figure 9, however, the ring of elastic deformable material is indicated by the numeral 46 and is molded to the angular cross sectional contour shown. One flange 47 of the ring 46 is clamped to the rear face of the member 11 adjacent the inner cylindrical surface 15 of the member 11 and the other flange 48 overlies the cylindrical surface 15. As in the foregoing modifications, the thickness of the flange 48 exceeds the radial distance between the cylindrical surfaces 14 and 15 so that when the inner member 10 is moved axially into the confines of the annular outer member 11, the flange 48 is stretched axially along the cylindrical surfaces and is placed under tension between the latter surfaces. It will, of course, be understood that the same type of ring 46 may also be used in connection with the equipment shown in Figure 2 of the drawings wherein the outer annular member 11 is moved axially relative to the inner member during assembly. In either case, the ring of elastic material is assembled under tension between the cylindrical surfaces 14 and 15 of the respective members.

What I claim as my invention is:

1. The method of forming a resilient joint between a pair of members having concentric cylindrical surfaces spaced radially from each other which comprises relatively positioning the members with the concentric surfaces thereof in spaced coaxial relationship, providing a ring of elastic deformable material having a thickness greater than the difference between the diameters of the cylindrical surfaces, positioning the ring to overlie the transverse face of one of the members and to bridge the annular space between said cylindrical surfaces, clamping said ring against the said face, and relatively moving the members towards each other to stretch the free portion of the ring along the cylindrical surfaces and to place the said ring under tension between the cylindrical surfaces.

2. The method defined in claim 1 wherein the said free portion of the strip has circumferentially spaced notches extending radially from the clamped portion thereof.

3. The method of forming a resilient joint between a rotatable inner member having a cylindrical surface and an outer member having a cylindrical surface concentrically arranged with respect to the cylindrical surface on the rotatable member, which comprises relatively positioning said members with the cylindrical surfaces in spaced coaxial relationship, interposing between adjacent ends of the surfaces an annular strip of resilient deformable material having a thickness substantially greater than the radial distance between said surfaces and bridging the annular space between said cylindrical surfaces, clamping the strip against the adjacent face of one of the members, said face being angularly disposed with respect to said cylindrical surfaces, folding the free portion of the strip over the cylindrical surface on said one member and at the same time stretching the strip to confine the same under tension between said surfaces by relatively moving the members axially toward each other to positions wherein the cylindrical surfaces are in concentric relationship.

4. The method defined in claim 1 wherein the inner edge portion of the annular strip is clamped against the inner member adjacent the cylindrical surface on the inner member and wherein the outer member is moved axially towards the inner member to fold the strip over the cylindrical surface on the inner member and to stretch the strip sufficiently to confine the same under tension between the cylindrical surfaces.

5. The method defined in claim 1 wherein the outer edge portion of the annular strip is clamped against the outer member adjacent the cylindrical surface on said outer member and wherein the inner member is moved along its axis towards the outer member to fold the strip over the cylindrical surface on the outer member and to stretch the strip sufficiently to confine the same under tension between the cylindrical surfaces.

6. The method of forming a resilient joint between a rotatable inner member having a cylindrical surface and an outer member having a cylindrical surface concentrically arranged with respect to the cylindrical surface on the inner member, which comprises relatively positioning said members with the cylindrical surfaces in spaced concentric relationship to provide an annular space therebetween, bridging the annular space at one end thereof with a ring of elastic deformable sheet material having a thickness greater than the radial distance between the cylindrical surfaces and having circumferentially spaced notches extending radially inwardly from the periphery thereof, exerting a force on the portion of the ring registering with the annular space in an axial direction toward said members to fold the ring along a circular line extending between the inner and outer edges of the ring and to displace the ring into the annular space, and at the same time stretching the ring to place the latter under tension between the cylindrical surfaces.

7. The method of forming a resilient joint between a pair of members rotatable about a common axis and having concentric cylindrical surfaces spaced radially from one another, which comprises relatively positioning the members with the concentric surfaces thereof in spaced coaxial relationship, providing a ring of elastic deformable material having an angular cross sectional contour and having one flange of a thickness greater than the difference between the diameters of the cylindrical surfaces, positioning the ring with the said one flange overlying the cylindrical surface on one of the members and with the other flange abutting the adjacent face of the latter member, clamping a transverse face of said other flange to the said one member, and relatively moving the members towards each other to stretch the said one flange of the ring along the cylindrical surfaces and to place the said one flange under tension between the cylindrical surfaces.

References Cited in the file of this patent

UNITED STATES PATENTS

| 1,043,012 | Hudson | Oct. 29, 1912 |
| 1,827,267 | Short | Oct. 13, 1931 |
| 1,940,885 | Rosenberg | Dec. 26, 1933 |
| 2,272,115 | Halkyard | Feb. 3, 1942 |
| 2,457,647 | Dodge | Dec. 28, 1948 |
| 2,628,416 | Sampson | Feb. 17, 1953 |
| 2,683,380 | Hutton | July 13, 1954 |
| 2,733,572 | Butterfield | Feb. 7, 1956 |